United States Patent
Rau

(10) Patent No.: US 6,304,569 B1
(45) Date of Patent: Oct. 16, 2001

(54) METHOD FOR THE RECEPTION OF MESSAGE CELLS FROM LOW-PRIORITY CONNECTIONS FROM ONLY ONE OF A NUMBER OF REDUNDANT TRANSMISSION PATHS

(75) Inventor: Peter Rau, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/049,709

(22) Filed: Mar. 27, 1998

(30) Foreign Application Priority Data

Mar. 27, 1997 (DE) .............................. 197 13 062

(51) Int. Cl.[7] .............................. H04L 12/28; H04L 12/56
(52) U.S. Cl. .............................. 370/395; 370/220
(58) Field of Search .............................. 370/395, 216, 370/217, 218, 219, 220, 229, 230, 235, 237, 248, 351, 353, 354, 359, 360, 367, 386, 387, 388, 394, 396, 419, 465, 252, 400, 402, 404, 442, 444

(56) References Cited

U.S. PATENT DOCUMENTS

| | | | |
|---|---|---|---|
| 4,965,788 | 10/1990 | Newman | 370/410 |
| 5,200,950 | 4/1993 | Foglar et al. | 370/219 |
| 5,222,063 | 6/1993 | Foglar et al. | 370/220 |
| 5,325,358 | 6/1994 | Goeldner | 370/219 |
| 5,390,174 * | 2/1995 | Jugel | 370/392 |
| 5,559,959 * | 9/1996 | Foglar | 714/43 |
| 5,704,047 * | 12/1997 | Schneeberger | 709/235 |
| 5,737,338 * | 4/1998 | Eguchi et al. | 714/716 |
| 5,740,157 * | 4/1998 | Demiray et al. | 370/219 |
| 5,959,995 * | 9/1999 | Wicki et al. | 370/400 |
| 5,983,260 * | 11/1999 | Hauser et al. | 709/201 |
| 5,999,527 * | 12/1999 | Petersen | 370/360 |
| 6,011,780 * | 1/2000 | Vaman et al. | 370/237 |
| 6,052,373 * | 4/2000 | Lau | 370/399 |
| 6,067,286 * | 5/2000 | Jones et al. | 370/218 |

* cited by examiner

Primary Examiner—Dang Ton
Assistant Examiner—Phirin Sam
(74) Attorney, Agent, or Firm—Schiff Hardin & Waite

(57) ABSTRACT

In a transmission system wherein redundant message cells, routed in the course of virtual connections according to the ATM (Asynchronous Transfer Mode) transmission method, are respectively transmitted via redundant transmission paths, a rejection of message cells belonging to a low-priority connection is permitted on the transmission paths to form the total traffic volume. To avoid an overload following the recombination of the message cell streams transmitted via the redundant transmission paths, the message cells of a connection of low priority are received by only one transmission path. For a number of connections, a selection identification character defines the transmission path by which the message cells belonging to these connections are received.

7 Claims, 2 Drawing Sheets

METHOD FOR THE RECEPTION OF MESSAGE CELLS FROM LOW-PRIORITY CONNECTIONS FROM ONLY ONE OF A NUMBER OF REDUNDANT TRANSMISSION PATHS

BACKGROUND OF THE INVENTION

1. Field of the Invention

The present invention is directed to a method for routing message cells from connections having respectively different priorities particularly in the reception of message cells from low-priority connections, such as non-real time (NRT) traffic, of the type wherein redundant message cells are respectively transmitted via redundant transmission paths, and only one of the received redundant message cells is selected for further processing.

2. Description of the Prior Art

In ATM (Asynchronous Transfer Mode) transmission, the sequence of message cells belonging to a virtual connection should be maintained. In order to meet a prescribed loss probability, parallel routing or forwarding, via through-connections along redundant transmission paths may be necessary. Among the redundantly transmitted message cells, only one message cell is selected at the reception location as the next message expected in the sequence. To designate the sequence, each message cell carries a series number, allocated to it in a cyclically progressing fashion in a field for the series number. The individually distinguishable series numbers of a virtual connection define a message cell sequence cycle.

The redundant transmission paths can each include a statistical multiplexer unit which is intended to form the traffic of low-priority connections during the activity of large buffer memories in such a way that the total traffic loads the output line optimally, i.e. to nearly 100 percent.

The statistical multiplexer units of the coupling field slices operate independently of each other, so that message cell streams with different contents can arise.

If a simple recombination algorithm is applied at the receiving location at the end of the redundant transmission paths, then the message cells which were rejected on one transmission path for reasons of overload are replaced by redundant message cells transmitted on another transmission path, which leads to a load of greater than 100% and thus to an overflow of the RPC buffer at the exit of the output unit.

A selection identification character could be entered in the receiving unit for the connections of lower priority, this selection identification character determining the transmission path by which message cells of the relevant connection are exclusively received for further processing. Given the failure of a transmission path, the board controller would have to rewrite all the affected entries which would last several seconds, given up to 8192 connections, and which would have to be followed by a message cell sequence cycle in order to avoid an undesired mixing of the message cell streams of the low-priority connections of the transmission paths participating in the switchover. During such a cycle the transmission paths participating in the switchover do not receive any message cells for further processing.

SUMMARY OF THE INVENTION

It is an object of the present invention to provide a method for a transmission system in which message cells transmitted redundantly via redundant transmission paths are rejected independently of each other on the transmission paths. It is a further object to provide such a method wherein a switchover from reception of only a first transmission path to reception of only a second transmission path takes place with a considerably reduced time requirement.

The above object is achieved in accordance with the principles of the present invention in a method for routing message cells received from connections having different priority via redundant transmission paths, wherein redundant message cells are respectively transmitted via redundant transmission paths with only one of the received redundant message cells being selected for further processing, wherein connections having low ranking priority are assigned an identification bit, with a number of such connections designated by the same identification bit forming a class, and wherein the identification bit is evaluated upon reception of a message cell, and the message cell contains a selection condition character which defines the transmission path by which the message cells belonging to the class are accepted for further processing.

Besides a simplification of the switchover, the method according to the invention offers a considerable abbreviation of the time requirement for the switchover which correspondingly lowers the loss of message cells due to the switchover, because for a number of connections, only the selection identification character has to be changed.

In an embodiment of the inventive method the identification bit is carried in each message cell of a connection of low priority. This measure offers a low-outlay distinguishability between message cells of different priority.

In another embodiment, an identification bit identifying the connections is evaluated in the reception of a message cell. Besides the advantage that no modifications to the message cells of a priority class are necessary, this measure, whereby an entry ensues in the output unit in the course of the buildup of a connection, offers the advantage that the entry is valid for all the message cells of the relevant connection.

The selection condition character in the method can be switched into an active mode or an inactive mode. This measure offers a simple possibility for exchange between an operation via only one transmission path and an operation via redundant transmission paths.

With the switchover from one transmission path to another transmission path, the receipt of message cells is interrupted for a strictly prescribed time-span. This measure prevents repetitions of message cells or overload at the exit due to the switchover.

In order to prevent cell repetition, with the switchover from a transmission path the reception of message cells ensues corresponding to an algorithm with blocking windows, as described in the United States Patent No. patent application by the present applicant entitled "Redundant Transmission System That Avoids Cell Repetitions" filed simultaneously herewith Ser. No. 09/049,815.

DESCRIPTION OF THE PREFERRED EMBODIMENTS

Figure 1:
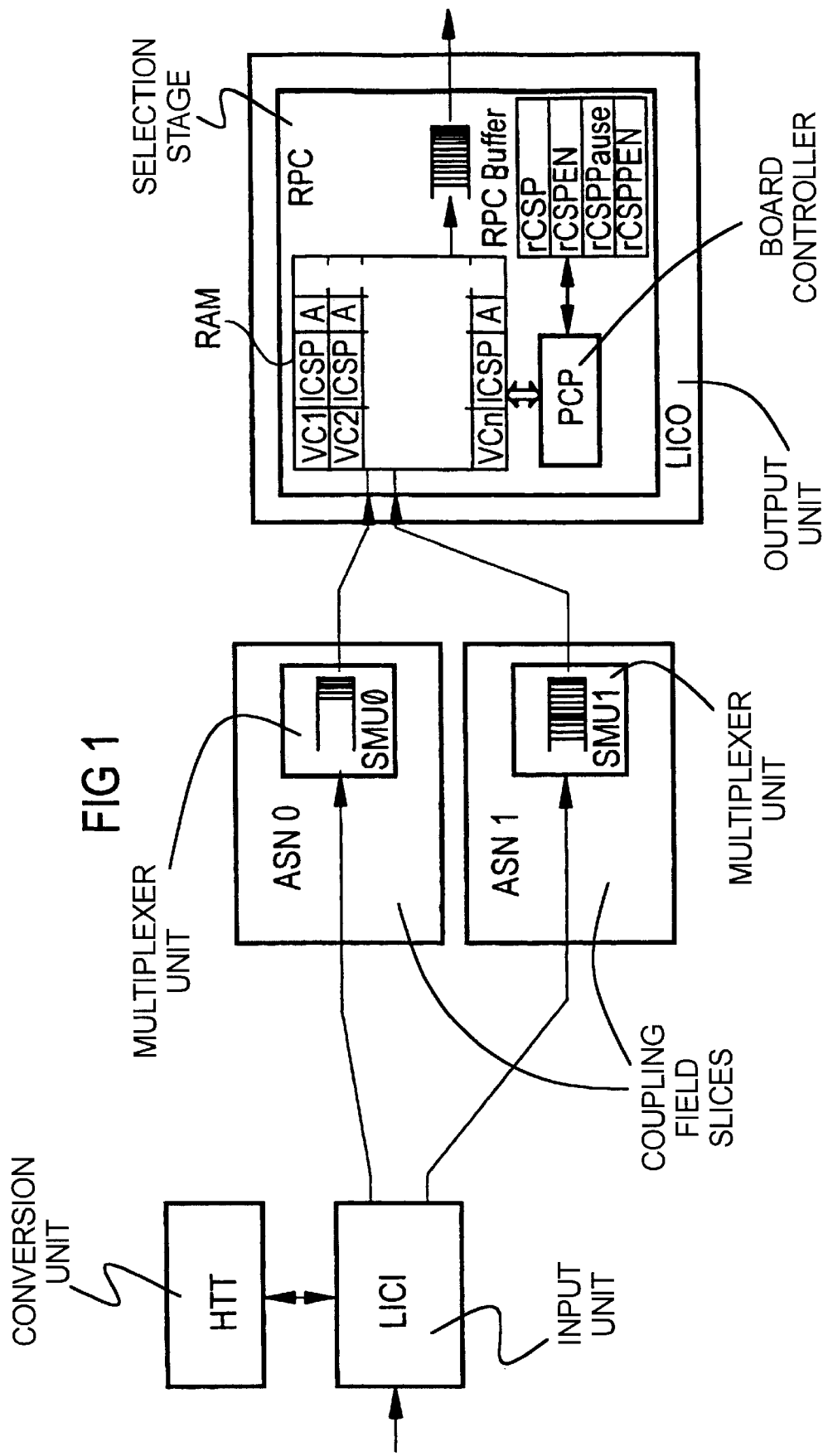
FIG. 1 is a schematic illustration of a switching arrangement which switches through message cells via redundant transmission paths, these message cells having been routed according to an asynchronous transmission method, operable in accordance with the inventive method.

The switching arrangement depicted in FIG. 1 includes an input unit LICI (for: Line Interface Circuit Input) at the input side, to which message cells are supplied in the course of a virtual connection, these message cells having been transmitted according to an asynchronous transmission method—particularly the ATM (Asynchronous Transfer Mode) method. 8192 virtual connections could be established, for example.

Figure 2:
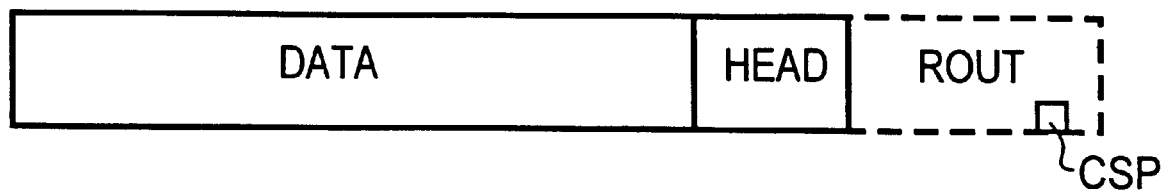
FIG. 2 shows a basic arrangement of a message cell in accordance with the invention.

A message cell depicted in FIG. 2 has a fixed length and is formed with a useful data portion DATA and a message cell header HEAD placed before this data portion. The useful data portion may be 48 bytes in length, and the message cell head may be 5 bytes in length. The message cell head contains a target information VPI (Virtual Path Identifier)/VCI (Virtual Channel Identifier) which identifies the message cell as belonging to a virtual connection and which identifies the receiver. With the arrival of a message cell in the input unit LICI, the target information of the message cell is delivered to a conversion unit HTT (for: Header Translation Table), which effects an addition of switch-through information ROUT (for: routing) to the message cell according to the target information. The switch-through information indicates the exit (output line) of the switching arrangement to which the message cells are to be switched through via a coupling field slice ASN (for: Asynchronous Switching Network). To meet a prescribed loss probability of $10^{-9}$, for example, a parallel switch-through via redundant coupling field slices can be necessary. The switching arrangement has two redundant coupling field slices ASN0, ASN1, which form redundant transmission paths. Duplication of the message cells ensues in the input unit LICI corresponding to the number of coupling field slices—a doubling in the exemplary embodiment—per group of message cells with the same contents. A message cell has a series number which is assigned in a cyclically progressing manner for consecutive message cells belonging to a virtual connection. The individually distinguishable series numbers of a virtual connection define a message cell sequence cycle. The message cells of a group have the same series number. One message cell from a group of message cells is switched through to the relevant exit via the redundant coupling field slices.

The redundant coupling field slices include respective statistical multiplexer units SMU0, SMU1 (for: Statistical Multiplexer Unit). With the aid of large buffer memories organized as connection-specific FIFO memories, a statistical multiplexer unit should so form the traffic of NRT (for: non-real-time) connections without a real-time requirement, such that the output line is optimally loaded, i.e. to nearly 100%. The connections without a real-time requirement, are for traffic of lower priority, as compared to traffic of RT (for: real time) connections with real-time requirements. A rejection of message cells is permissible in the NRT connections without real-time requirements, such as connections of an undefined message cell rate (what is known as UBR (Undefined Bit Rate connections))—or connections with a message cell rate which is readily available (known as ABR (for: Available Bit Rate) connections) for example.

The statistical coupling multiplexer units of the coupling field slices do not operate in a synchronous fashion independently of each other. Particularly when overload is arising, message cells of different connections without real time are rejected in the employment of conventional techniques such as Early Packet Discard EPD or Partial Packet Discharge (PPD) in the coupling field slices, this rejection producing message currents with different contents.

The message cells delivered by the redundant coupling field slices are received by an output unit LICO (for: Line Interface Circuit Output). The received message cells are checked in the output unit LICO for errors. This can occur by checking parity bits. Message cells determined to be erroneous are rejected. The output unit LICO includes a selection stage RPC (for Redundant Path Combination) which selects only one message cell from a group of message cells received as error-free and further processes this message cell. The further processing may occur by a routing via an RPC buffer and a line to a remotely disposed means.

The sequence of the message cells for a virtual connection must be maintained in the routing of message cells according to the ATM transmission method.

The selection stage RPC includes a memory, such as a random access memory RAM having a memory line (or row) for each connection VC1, VC2, ..., Vcn. A space (not shown in FIG. 1) is reserved in the memory line for storing the series number of the message cell last routed for the relevant virtual connection. A memory space A for each connection is further reserved in the memory line, this space designating the transmission path over which the message cell of the relevant connection last selected for routing was transmitted.

It is checked in the selection stage RPC whether an incoming message cell is the one which is to be routed for the relevant virtual connection immediately following the last—routed (most recently routed) message cell. To this end, a recombination algorithm evaluates the series number stored in the memory fine for the relevant virtual connection as well as the contents of the memory space A. The determination of the message cell immediately following can ensue by incrementation of the stored series number of the last-routed message cell and a comparison of the incremented series number with the series number of a message cell just switched through. The determination of the message cell immediately following thus is accomplished by an easily performed comparison of the series numbers.

In general, the message cell arriving first in the output unit LICO (i.e., in the selection stage RPC therein) is routed to a group of message cells. A message cell arriving in the selection stage RPC later than a message cell of the same group that was previously selected for routing is rejected. European Applications 0 384 936, 0 453 606 (corresponding to U.S. Pat. No. 5,222,063) and 0 453 607 (corresponding to U.S. Pat. No. 5,200,950), for example, teach particular recombination algorithms for determining the respective message cell to be routed next for a virtual connection.

In addition, a determination of the error rate of a transmission path can ensue through progressive evaluation of the contents of the memory space A with the aid of a sorted algorithm, for example.

If the recombination algorithm for the recombination of RT connections with real-time requirements is used as well for NRT connections with non-real-time requirements, the message cells on a transmission path rejected for reasons of overload are replaced by redundant message cells transmitted on another transmission path, which leads to a load of greater than 100 percent and thus to an overflow of the RPC buffer at the exit of the output unit LICO.

In accordance with the invention the NRT connections without real-time requirements and the RT connections with real-time requirements are distinguishable by identification characters. As shown in FIG. 2, this can ensue by means of an identification character CSP (for: Conditional Single Plane) carried in the switch-through information ROUT of the message cell for NRT connections without real-time requirements, for example. In the exemplary embodiment an identification character lCSP (for: local Conditional Single Plane) is set in the memory line for NRT connections without real-time requirements. The entries in a memory line of the output unit LICO for a connection may ensue simultaneously with the entries in the input unit LICI in the course of the buildup of the connection. (The entries for a connection are erased with the dismantling of this connection.)

The connections for which the identification character is set in an active condition, e.g. the logic HIGH condition, form a class. A global selection identification character rCSP (for: regional Conditional Single Plane) designates exactly one transmission path. The global selection identification character rCSP defines the transmission path by which message cells of the connection belonging to the class are received for further processing.

Upon the arrival of a message cell, the recombination algorithm first checks whether an identification character lCSP is set for the appertaining connection. If an active identification character lCSP is set, then the contents of the memory space A are of no importance and the recombination algorithm further checks whether the message cell was transmitted on the transmission path designated by the global selection identification character rCSP. A message cell which was transmitted on the transmission path designated by the global selection identification character rCSP is received for further processing. A message cell which was not transmitted on the transmission path designated by the global selection identification character rCSP is rejected.

In the method according to the invention, the message cells of connections which are allocated to a class are only received for further processing if they are transmitted by a transmission path just designated. The method according to the invention realizes a connection-dependent transmission via a single transmission path in a transmission system with redundant transmission paths, i.e. a single-path transmission. By setting and resetting a global activation character rCSPEN (for: regional Conditional Single Plane Enable), the single-path transmission can be switched into an active mode or into an inactive mode.

If the global selection identification character rCSP is switched over to designated of another transmission path, then message cells of connections allocated to the class are received exclusively by transmission paths with the current designation. In the method according to the invention, a switchover of the global selection identification character rCSP, which can be performed in one step, effects a switchover from one transmission path to another transmission path for all the connections belonging to the class. A switchover of the global selection identification character rCSP can ensue through the board controller PCP with a register command. A switchover of the global selection identification character rCSP can ensue as a reaction to reaching a prescribed error rate or to reaching a determination of a failure of the transmission path just switched into the active mode.

With the switchover from one transmission path to another transmission path a global pause identification character rCSPPause (for regional Conditional Single Plane Pause) may be simultaneously set. The pause identification character, which is cleared after the expiration of a strictly prescribed time-span $t_{pause}$, effects the rejection of all the message cells of the connections belonging to the class for as long as this pause identification character remains set. Thus, multiplications or repetitions of message cells due to the switchover are prevented. The strictly prescribed time-span $t_{pause}$ may be equally as long as the maximum expected difference between the transit times of the transmission paths, or as long as the duration of a message cell sequence cycle.

Figure 3:
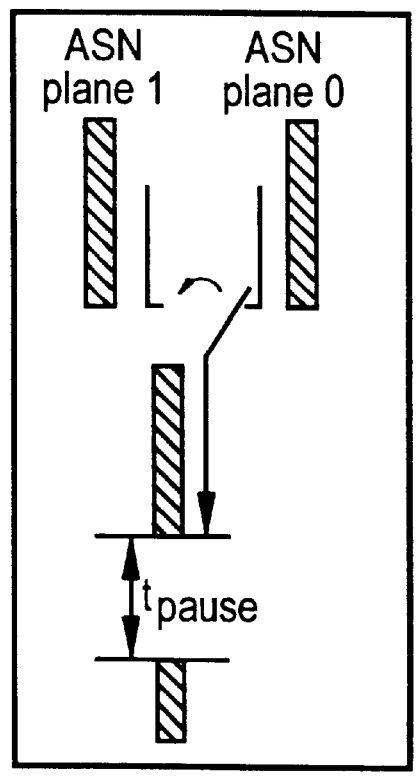
FIG. 3 illustrates a switchover process with a pause in accordance with the invention.

FIG. 3 shows the basic flow of the message cell streams in a switchover from the transmission path ASN0 to the transmission path ASN1 with a pause of strictly prescribed time-span $t_{pause}$. The original message cell stream transmitted by the transmission path ASN0 is routed at the lower margin of FIG. 3 with a determination for further processing. A pause of the time-span $t_{pause}$ follows this message cell stream with the beginning of the switchover, during which pause message cells cannot be routed. Following the expiration of the prescribed time-span the message cell stream transmitted via the transmission path ASN1 is routed. The loss of message cells occurring during the prescribed time-span $t_{pause}$ is permissible for NRT connections without real-time requirements.

Alternatively to the blocking of the interconnection with the use of the pause character, a repetition of previously transmitted cells following switchover of the transmission path can ensue by the application of the algorithm with blocking windows as described in the aforementioned United States patent application of the present applicant filed simultaneously herewith.

For easier and clearer demonstrability, the subject matter of the invention has been described above only for two transmission paths, but the inventive method can be employed for transmission systems with a larger number of transmission paths.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for routing message cells from connections of different priority via redundant transmission paths, comprising the steps of:

transmitting redundant message cells respective via redundant transmission paths, resulting in a plurality of received redundant message cells;

selecting only one of the received redundant message cells for further processing;

assigning an identification bit to each connection having a low ranking priority and defining a class of connections respectively designated by the same identification bit;

during reception of a message cell, evaluating said identification bit; and providing each message cell with a selection condition character defining the transmission path by which message cells received on connections in said class are accepted for further processing.

2. A method as claimed in claim 1 comprising the additional step of carrying said identification bit in each message cell in each connection having said low ranking priority.

3. A method as claimed in claim 1 wherein the step of evaluating said identification bit comprises evaluating said identification bit immediately upon receipt of each of said received redundant message cells.

4. A method as claimed in claim 1 comprising the additional step of switching said selection condition character into an active mode or into an inactive mode.

5. A method as claimed in claim 1 comprising the additional step of:
when switching from one transmission path to another transmission path, interrupting acceptance of message cells at a reception location for a predetermined time span.

6. A method as claimed in claim 1 comprising the additional step of:
when switching from one transmission path to another transmission path, preventing repetition of cells already designated for routing by employing a blocking window.

7. A method as claimed in claim 6 comprising the additional step of forming a random combination with said blocking window causing cells for high priority connections to be conducted via redundant transmission paths a plurality of times, with only one copy of each cell being routed.

* * * * *